US011451368B2

(12) United States Patent
Isshiki et al.

(10) Patent No.: US 11,451,368 B2
(45) Date of Patent: Sep. 20, 2022

(54) ENCRYPTED INFORMATION MATCHING DEVICE, ENCRYPTED INFORMATION MATCHING METHOD, AND RECORDING MEDIUM HAVING ENCRYPTED INFORMATION MATCHING PROGRAM STORED THEREON

(71) Applicant: NEC Corporation, Tokyo (JP)

(72) Inventors: Toshiyuki Isshiki, Tokyo (JP); Haruna Higo, Tokyo (JP); Kengo Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 16/305,105

(22) PCT Filed: Jun. 1, 2017

(86) PCT No.: PCT/JP2017/020400
§ 371 (c)(1),
(2) Date: Nov. 28, 2018

(87) PCT Pub. No.: WO2017/209228
PCT Pub. Date: Dec. 7, 2017

(65) Prior Publication Data
US 2020/0322124 A1    Oct. 8, 2020

(30) Foreign Application Priority Data

Jun. 2, 2016 (JP) .............................. JP2016-110642

(51) Int. Cl.
*H04L 9/00* (2022.01)
*G06F 16/28* (2019.01)
(Continued)

(52) U.S. Cl.
CPC ............ *H04L 9/008* (2013.01); *G06F 16/285* (2019.01); *H04L 9/0897* (2013.01); *G06F 21/32* (2013.01); *H04L 9/3231* (2013.01)

(58) Field of Classification Search
CPC ........................... H04L 9/008; G06K 9/00087
See application file for complete search history.

(56) References Cited

U.S. PATENT DOCUMENTS

2009/0006855 A1    1/2009 Tuyls et al.
2010/0246812 A1*   9/2010 Rane ..................... H04L 9/3271
                                                         380/28

(Continued)

FOREIGN PATENT DOCUMENTS

JP    2002-297549 A    10/2002
JP    2006-521025 A     6/2006

(Continued)

OTHER PUBLICATIONS

Haruna Higo et al., "Privacy-Preserving Fingerprint Authentication Resistant to Hill-Climbing Attacks", SAC 2015, Aug. 2015, LNCS 9566, pp. 44-64 (total 21 pages).

(Continued)

*Primary Examiner* — Esther B. Henderson
(74) *Attorney, Agent, or Firm* — Sughrue Mion, PLLC

(57) ABSTRACT

An encrypted information matching device 20 includes: a storage unit 240 in which representative information representing a group based on similarity in a characteristic and encrypted information to be matched belonging to the group are associated with each other and stored; an identification unit 231 which calculates a first similarity between the encrypted input information and the representative information stored in the unit 240, and which, based on the first similarity, identifies a group to be matched with the first input information; and a determination unit 232 which calculates a second similarity between the encrypted input (Continued)

information and the encrypted information to be matched that belongs to the group identified, in a state in which the input information and the information to be matched are encrypted, wherein the unit 232 determines the presence or absence of information to be matched which makes the calculated second similarity satisfy criteria.

10 Claims, 8 Drawing Sheets

(51) Int. Cl.
*H04L 9/08* (2006.01)
*G06F 21/32* (2013.01)
*H04L 9/32* (2006.01)

(56) References Cited

U.S. PATENT DOCUMENTS

| | | | |
|---|---|---|---|
| 2014/0289536 A1* | 9/2014 | MacCarthy | G16B 50/00 713/189 |
| 2015/0082405 A1 | 3/2015 | Sakemi et al. | |
| 2016/0119119 A1* | 4/2016 | Calapodescu | G06F 21/6227 380/30 |
| 2017/0161326 A1* | 6/2017 | Anderson | G06F 16/2468 |
| 2018/0278410 A1* | 9/2018 | Hirano | G06F 16/951 |

FOREIGN PATENT DOCUMENTS

| | | |
|---|---|---|
| JP | 2012-238256 A | 12/2012 |
| JP | 2014-126865 A | 7/2014 |
| JP | 2015-060433 A | 3/2015 |
| JP | 2015-135541 A | 7/2015 |
| WO | 2014/185450 A1 | 11/2014 |

OTHER PUBLICATIONS

Higo et al., "A Concealed Biometric Authentication System Ensuring Less Information Disclosure during Authentication", 2016 Symposium on Cryptography and Information Security (SCIS2016), Jan. 2016, 3C2-4, total 4 pages.

Fujiwara et al., "Searchable Encryption Database System for Large-scale Data", 35th JCMI, Nov. 2015, pp. 564-567 (total 4 pages).

International Search Report dated Aug. 15, 2017, issued by the International Searching Authority in application No. PCT/JP2017/020400 [PCT/ISA/210].

Written Opinion dated Aug. 15, 2017, issued by the International Searching Authority in application No. PCT/JP2017/020400 [PCT/ISA/237].

Japanese Office Action for JP Application No. 2018-520987 dated Jul. 20, 2021 with English Translation.

* cited by examiner

Fig. 2

143 MANAGEMENT TABLE

| INFORMATION TO BE MATCHED IDENTIFIER | BELONGING GROUP |
|---|---|
| 1 | 3 |
| 2 | 8 |
| 3 | L |
| ⋮ | ⋮ |
| N | 2 |

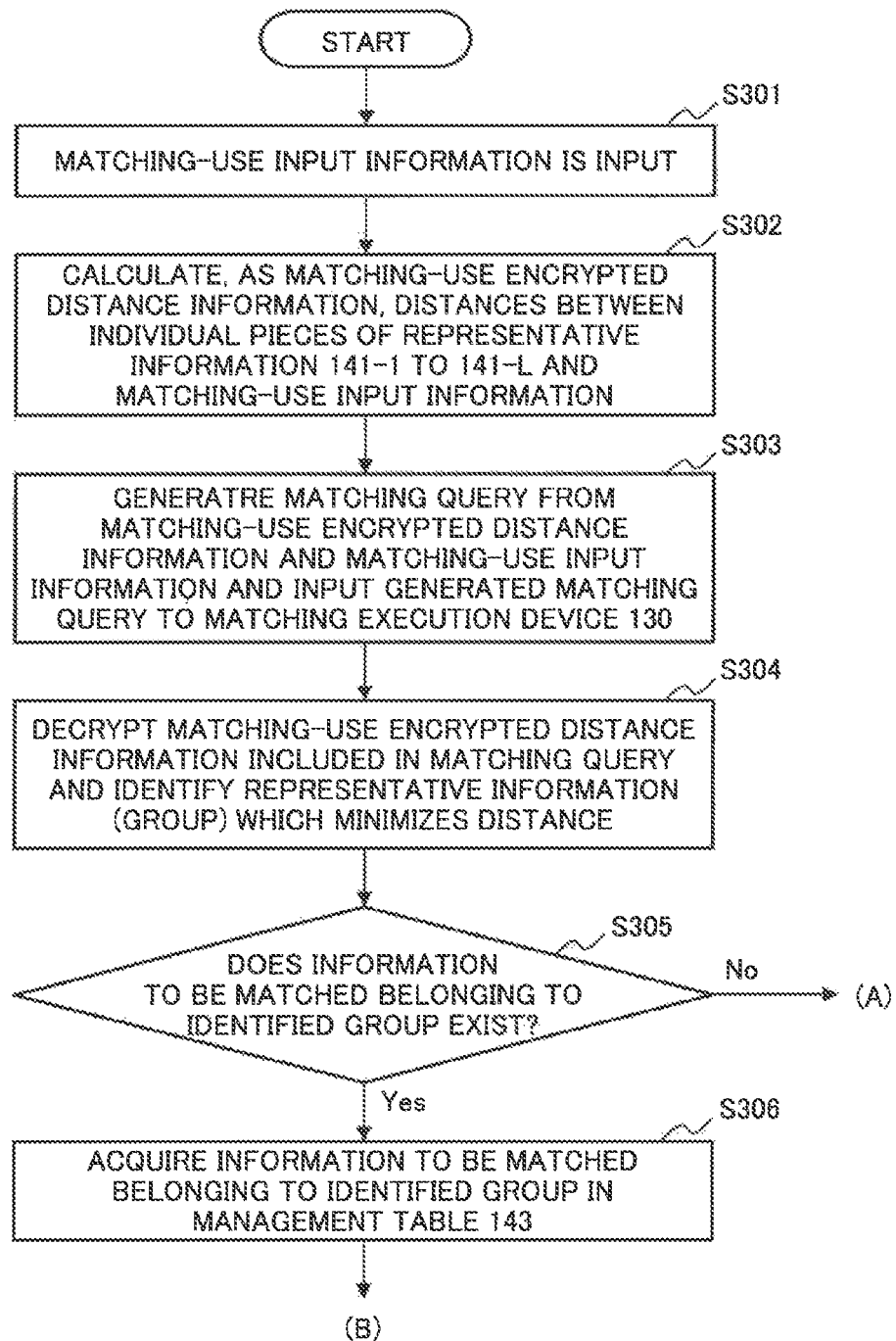

ENCRYPTED INFORMATION MATCHING DEVICE, ENCRYPTED INFORMATION MATCHING METHOD, AND RECORDING MEDIUM HAVING ENCRYPTED INFORMATION MATCHING PROGRAM STORED THEREON

This application is a National Stage Entry of PCT/JP2017/020400 filed on Jun. 1, 2017, which claims priority from Japanese Patent Application 2016-110642 filed on Jun. 2, 2016, the contents of all of which are incorporated herein by reference, in their entirety.

TECHNICAL FIELD

The invention of the present application relates to a technique of executing matching processing for encrypted information to be matched, the processing permitting ambiguity in the information.

BACKGROUND ART

Recently, with rapid progress of cloud computing, services based on data of users being allocated on calculation resources connected to a communication network are rapidly spreading. In such services, chances where delicate data of users are handled are increasing, and therefore it is important to safely manage data of users. Under such a circumstance, research and development for a technique of managing data of a user in a state of being encrypted, and executing retrieval, statistical processing, and the like at high speed, in an open communication network environment are being actively conducted.

On the other hand, recently, in a circumstance where crimes that attack vulnerability of personal authentication using a password, a magnetic card, or the like frequently occur, attention is paid to a biometric authentication technique based on a biological feature such as a fingerprint and a vein ensuring higher safety. In a system using biometric authentication, it is necessary to store a template relating to biological information on a database in order to verify authentication information. Biological information such as a fingerprint and a vein is data basically unchanged through life, and therefore damage caused when information leakage occurs is enormous. Thus, biological information is information which requires highest confidentiality. Therefore, a template protection-type biometric authentication technique that executes authentication in a state that template information is concealed in such a way that "impersonation" cannot be performed even when a template leaks has been important.

As a technique relating to such a technique, PTL 1 discloses a system in which retrieval processing for large-scale encryption data is executed at high speed in a state that a retrieval query is encrypted. A storage device in the system stores, as data to be retrieved, confidential data in which plaintext data are concealed and a concealment index in which a plaintext index for classifying plaintext data is concealed. A computation device in the system receives, from a retrieval client, a confidential data-use query in which a plaintext query is concealed and a concealment index-use query in which a plaintext index is concealed. The computation device retrieves, on the basis of a predetermined retrieval-enabling encryption technique, a concealment index corresponding to a concealment index-use query in the storage device, and retrieves confidential data corresponding to a confidential data-use query by using, as a target, a confidential data group classified into the retrieved concealment index.

Further, PTL 2 discloses a person oneself authentication system that narrows down a target to be matched in such a way that an influence of a biological information input error such as a way to place a finger is avoided. The system calculates a similarity between extracted biological feature data and biological data previously set as criteria. The system stores the extracted biological feature data and the calculated similarity information on a storage means and selects, from the storage means, a target to be matched, on the basis of the similarity information. Then, the system matches authentication-use biological feature data and the biological feature data selected as a target to be matched.

Further, PTL 3 discloses a matching system including first to third nodes. The first node in the system encrypts authentication data by using a public key and transmits the encrypted authentication data to the third node. The first node acquires, when receiving authentication-target data to be matched with authentication data, authentication data from the third node, and thereby calculates a distance between the authentication data and the authentication-target data in a state that these pieces of data are encrypted. Then, the first node substitutes the calculated distance into a polynomial acquired from the third node, generates an encrypted value as matching data, and transmits the matching data to the second node. The second node generates a pair of a public key and a secret key and transmits the generated public key to the first node. The second node matches the authentication data and the authentication-target data on the basis of the generated secret key and the matching data. The third node stores the encrypted authentication data and generates a polynomial including a threshold of a distance between authentication data and authentication-target data as a parameter.

CITATION LIST

Patent Literature

[PTL 1] Japanese Unexamined Patent Application Publication No. 2015-135541
[PTL 2] Japanese Unexamined Patent Application Publication No. 2002-297549
[PTL 3] International Publication No. WO 2014/185450

Non Patent Literature

[NPL 1] Haruna Higo, Toshiyuki Isshiki, Kengo Mori, Satoshi Obana, "Preserving Fingerprint Authentication Resistant to Hill-Climbing Attacks", SAC2015, August 2015
[NPL 2] Higo, Isshiki, Mori, Obana, "A Concealed Biometric Authentication System Ensuring Less Information Disclosure during Authentication", SCIS2016, January 2016

SUMMARY OF INVENTION

Technical Problem

As personal authentication, there are one-to-one authentication and one-to-N authentication (N is an integer equal to or more than 2). The one-to-one authentication is authentication that, for example, a person to be authenticated insists "I am A" and an authenticator verifies that the person to be authenticated is A. While on the other hand, the one-to-N authentication is authentication that, for example, a person to be authenticated insists that "I belong to a group (organization) B" and an authenticator verifies that the person to be authenticated belongs to the group B. The one-to-N authentication contains, for example, N times one-to-one authentication. So, the one-to-N authentication is unrealistic in terms of calculation cost when a value of N is large.

Further, in biometric authentication, as described in PTL 2, it is necessary to consider an influence by an input error of biological information coming from a way to place a finger and so on, and therefore it is necessary for matching processing to permit ambiguity of information to be matched.

When one-to-N biometric authentication is executed, it is conceivable that, for example, by grouping based on a feature value (e.g. a fingerprint) acquired from a living body, or by execution of simple authentication using a part of biological information, a target to be matched is narrowed down, and thereafter matching processing that permits ambiguity in information of the target to be matched is executed. Such matching processing is able to be realized, when the biological information is not concealed, by executing calculation using a value indicating the biological information. However, in biometric authentication in which safety is higher and biological information is concealed, biological information transmitted from a person to be authenticated is concealed by encryption or the like, and therefore it is difficult to execute the above-described matching processing. In other words, a problem is to execute matching processing that permits ambiguity in information to be matched, safely and at high speed. It cannot be said that the configurations described in PTLs 1 to 3 are sufficient for solving such a problem. A main object of the invention of the present application is to provide an encrypted information matching device and the like that solve the problem.

Solution to Problem

An encrypted information matching device according to one aspect of the invention of the present application includes: a storage means that stores, when one or more pieces of information to be matched are classified into groups on the basis of similarity in a characteristic, one or more pieces of representative information and the information to be matched in association with each other, the representative information representing the group, and the information to be matched being encrypted and belonging to the group; an identification means that calculates a first similarity between encrypted first input information and the one or more pieces of representative information stored on the storage means and identifies, on the basis of the calculated first similarity, the group to be matched with the first input information; and a determination means that calculates a second similarity between the encrypted first input information and the one or more pieces of encrypted information to be matched in a state that the first input information and the information to be matched are encrypted, the information to be matched belonging to the group identified by the identification means, and determines whether or not the information to be matched which makes the calculated second similarity satisfy criteria exists.

In another viewpoint that achieves the object, an encrypted information matching method according to one aspect of the invention of the present application includes: when one or more pieces of information to be matched are classified into groups on the basis of similarity in a characteristic and one or more pieces of representative information and the information to be matched are stored on storage means in association with each other, the representative information representing the group, and the information to be matched being encrypted and belonging to the group, by using an information processing device, calculating a first similarity between encrypted first input information and the one or more pieces of representative information stored on the storage means; identifying, on the basis of the calculated first similarity, the group to be matched with the first input information; calculating a second similarity between the encrypted first input information and the one or more pieces of encrypted information to be matched in a state that the first input information and the information to be matched are encrypted, the information to be matched belonging to the identified group; and determining whether or not the information to be matched which makes the calculated second similarity satisfy criteria exists.

Further, in yet another viewpoint that achieves the object, an encrypted information matching program according to one aspect of the invention of the present application is a program which causes a computer accessible to a storage means that stores, when one or more pieces of information to be matched are classified into groups on the basis of similarity in a characteristic, one or more pieces of representative information and the information to be matched in association with each other, the representative information representing the group, and the information to be matched being encrypted and belonging to the group, to execute: identification processing of calculating a first similarity between encrypted first input information and the one or more pieces of representative information stored on the storage means and identifying, on the basis of the calculated first similarity, the group to be matched with the first input information; and determination processing of calculating a second similarity between the encrypted first input information and the one or more pieces of encrypted information to be matched in a state that the first input information and the information to be matched are encrypted, the information to be matched belonging to the group identified by the identification processing, and determining whether or not the information to be matched which makes the calculated second similarity satisfy criteria exists.

Further, the invention of the present application is also achievable by a computer-readable non-transitory recording medium that stores the encrypted information matching program (computer program).

Advantageous Effects of Invention

The invention of the present application enables matching processing that permits ambiguity in information to be matched, to be executed safely and at high speed.

BRIEF DESCRIPTION OF DRAWINGS

FIG. 2 is a diagram exemplarily illustrating a configuration of a management table 143 according to the first example embodiment of the invention of the present application.

Figure 4:
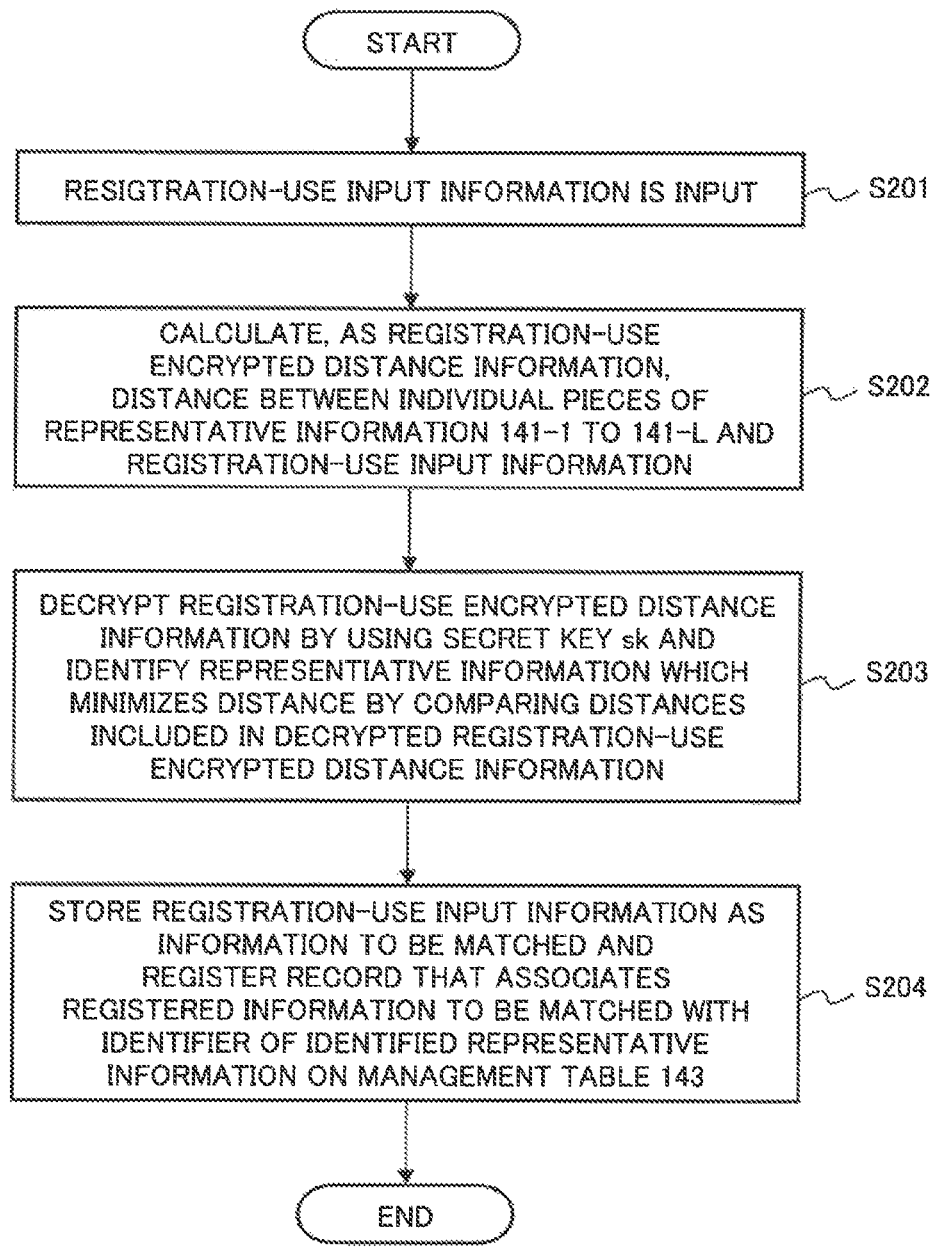

FIG. 4 is a flowchart illustrating an operation in which the encrypted information matching system 10 according to the first example embodiment of the invention of the present application registers registration-use input information as information to be matched.

FIG. 5A is a flowchart (1/2) illustrating an operation in which the encrypted information matching system 10 according to the first example embodiment of the invention of the present application matches matching-use input information with information to be matched.

Figure 5B:
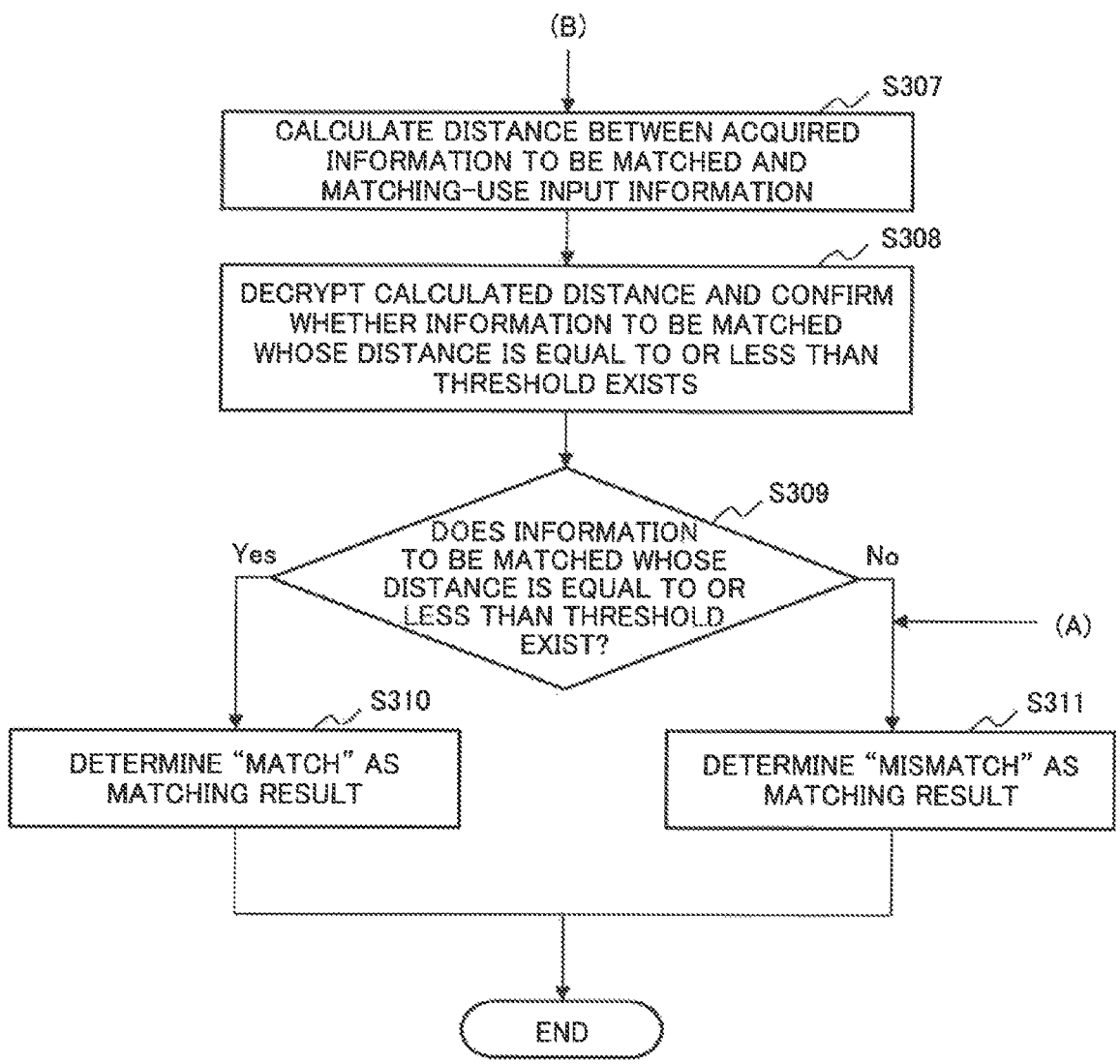

FIG. 5B is a flowchart (2/2) illustrating an operation in which the encrypted information matching system 10 according to the first example embodiment of the invention of the present application matches matching-use input information with information to be matched.

Figure 6:
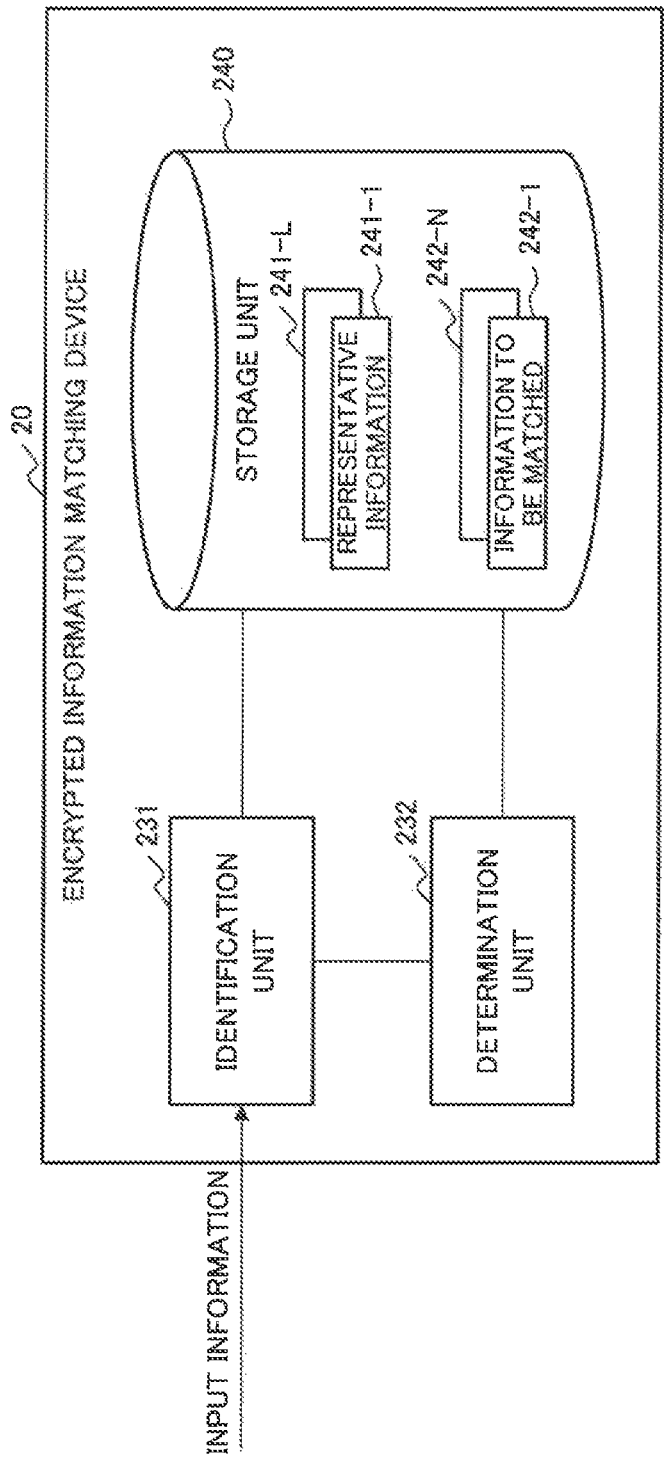

FIG. 6 is a block diagram illustrating a configuration of an encrypted information matching device 20 according to a second example embodiment of the invention of the present application.

Figure 7:
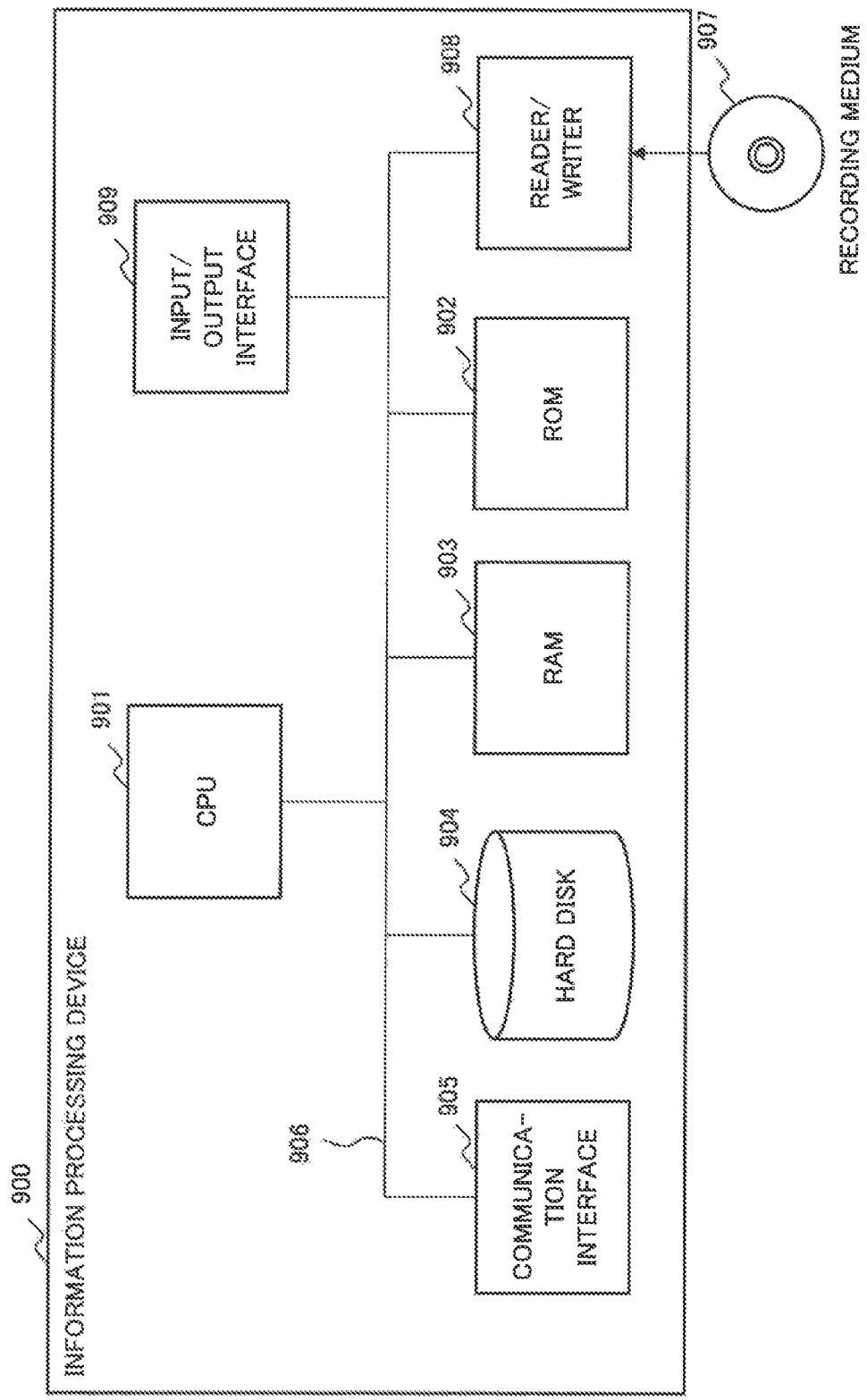

FIG. 7 is a block diagram illustrating a configuration of an information processing device capable of running an encrypted information matching device (system) according to each example embodiment of the invention of the present application.

EXAMPLE EMBODIMENT

Hereinafter, example embodiments of the invention of the present application are described in detail with reference to the accompanying drawings.

First Example Embodiment

Figure 1:
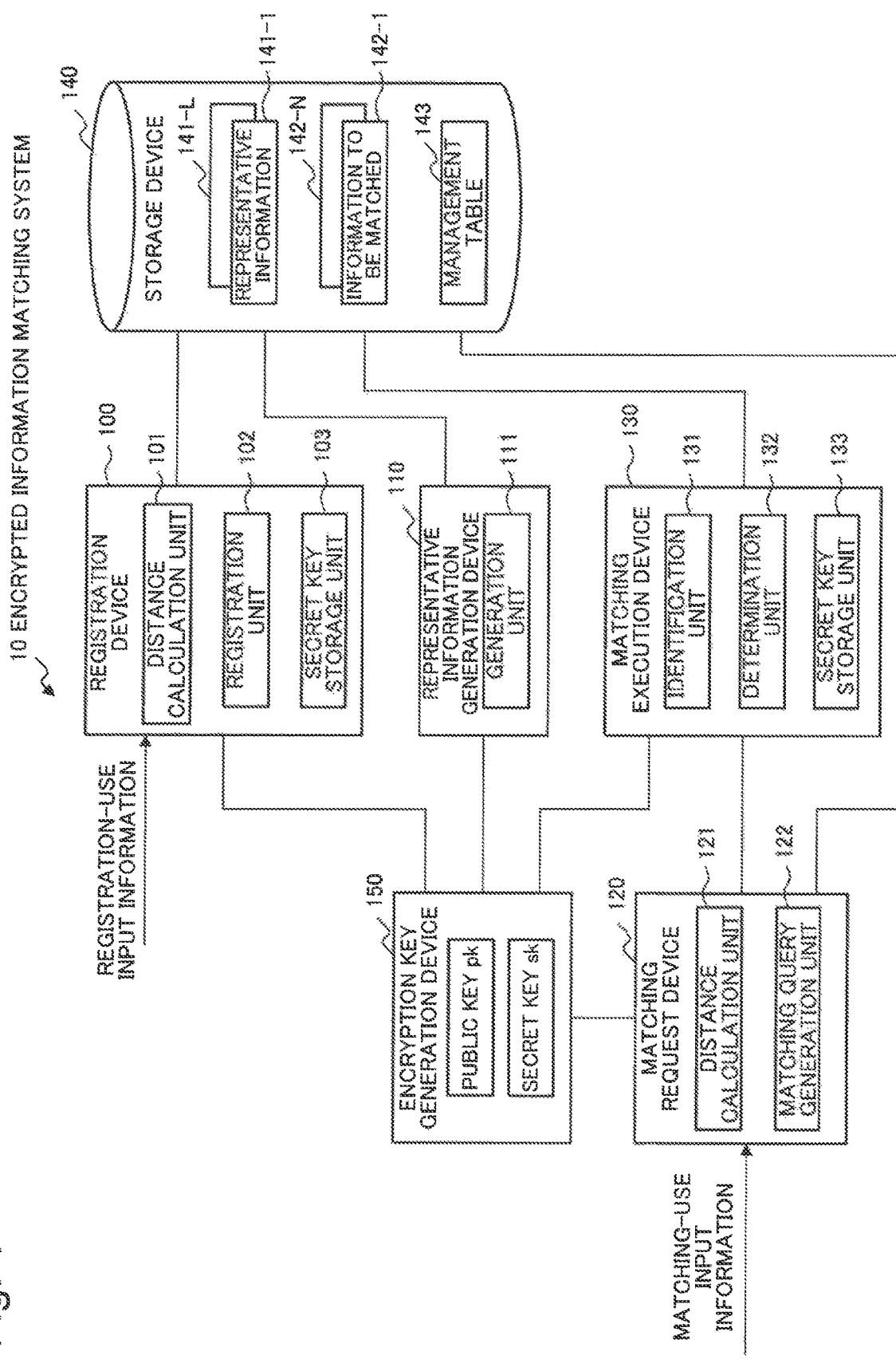
FIG. 1 is a block diagram illustrating a configuration of an encrypted information matching system 10 according to a first example embodiment of the invention of the present application.

FIG. 1 is a block diagram conceptually illustrating a configuration of an encrypted information matching system 10 according to a first example embodiment of the invention of the present application. The encrypted information matching system 10 is a system that executes one-to-N authentication of input information such as biological information with information to be matched already registered. The encrypted information matching system 10 executes matching processing that permits ambiguity in input information, for example, by considering an influence of an input error of biological information such as a way to place a finger.

The encrypted information matching system 10 according to the present example embodiment includes a registration device 100, a representative information generation device 110, a matching request device 120, a matching execution device 130, a storage device 140, and an encryption key generation device 150. These devices are communicably connected by a communication network. The encrypted information matching system 10 may be an encrypted information matching device in which the configuration illustrated in FIG. 1 is included in a single device.

The storage device 140 includes, for example, a storage device such as a magnetic disk, an electronic memory, or the like. The storage device 140 stores pieces of representative information 141-1 to 141-L (L is any natural number) stored by the representative information generation device 110 and pieces of information to be matched 142-1 to 142-N (N is any natural number) and a management table 143 stored by the registration device 100. Details of these pieces of information stored on the storage device 140 are described later.

The encryption key generation device 150 generates a public key pk used in encryption processing and a secret key sk used in decryption processing, for example, via input of parameter information relating to security. The encryption key generation device 150 delivers the generated public key pk to the registration device 100, the representative information generation device 110, the matching request device 120, and the matching execution device 130. The encryption key generation device 150 delivers the generated secret key sk to the registration device 100 and the matching execution device 130.

The representative information generation device 110 includes a generation unit 111. The generation unit 111 generates one or more pieces of representative information on the basis of information representing a generation specification of representative information input from an outside. The representative information is information representing each group (i.e. being criteria in grouping) when information such as biological information and the like that is a target for matching processing executed by the encrypted information matching system 10 is grouped (classified) on the basis of similarity in the information. The information representing a generation specification of representative information is, for example, information indicating academic criteria in grouping. The generation unit 111 encrypts representative information generated by using a public key pk delivered from the encryption key generation device 150 and stores the encrypted representative information on the storage device 140 as pieces of representative information 141-1 to 141-L. In other words, with regard to information that is a target for matching processing executed by the encrypted information matching system 10 according to the present example embodiment, there are L groups.

The registration device 100 includes a distance calculation unit 101, a registration unit 102, and a secret key storage unit 103. The secret key storage unit 103 is a storage device such as an electronic memory or a magnetic disk and stores a secret key sk delivered from the encryption key generation device 150.

Registration-use input information (second input information) is input to the registration device 100 from another device that is not illustrated. The registration-use input information is information previously stored (registered) on the storage device 140 as a target to be matched when the encrypted information matching system 10 executes matching processing. The registration-use input information is information encrypted by using a public key pk. Alternatively, the registration-use input information may be generated by the registration device 100.

The distance calculation unit 101 calculates an n-dimensional Euclidean distance between registration-use input information and individual pieces of representative information 141-1 to 141-L stored on the storage device 140 in a state that the registration-use input information and the pieces of representative information 141-1 to 141-L are encrypted. The "n" is a natural number indicating a dimension of registration-use input information and representative information. In this embodiment, the n-dimensional Euclidean distance may be simplistically referred as "distance" hereinafter. A distance between registration-use input information and representative information is an indicator representing a similarity (third similarity) between the registration-use input information and the representative information.

When information X is represented as an n-dimensional vector X(x[1],x[2], . . . , x[n]) and information Y is represented as an n-dimensional vector Y(y[1],y[2], . . . , y[n]), a square Euclidean distance d(X,Y) between the information X and the information Y is calculated by $$d(X,Y)=(x[1]-y[1])^\wedge 2+(x[2]-y[2])^\wedge 2+ \ldots +(x[n]-y[n])^\wedge 2 \quad \text{(Equation 1)}$$

In equation 1, "^" is an operator representing a power.

The encrypted information matching system 10 according to the present example embodiment uses somewhat homomorphic encryption as encryption. The somewhat homomorphic encryption is encryption which is able to execute, without decrypting an encrypted plaintext (information before encryption), an operation such as addition and multiplication for the encrypted plaintext. At that time, an operation result thereof is determined as an encrypted value. In other words, when information X encrypted by using a public key pk is represented as "Enc(pk,X)" and information Y encrypted by using a public key pk is represented as "Enc(pk,Y)", the distance calculation unit 101 is able to calculate "Enc(pk,d(X,Y))" in which a distance d(X,Y) is encrypted by a public key pk, without decrypting "Enc(pk,X)" and "Enc(pk,Y)".

The registration unit 102 stores registration-use input information input from an outside or generated by the registration device 100 on the storage device 140 as information to be matched 142-$i$ (i is any integer among 1 to N). At that time, the registration unit 102 acquires pieces of representative information 141-1 to 141-L from the storage device 140.

Encrypted registration-use input information is represented as "Enc(pk,X)", and encrypted representative information 141-$i$ (i is any integer among 1 to L) is represented as "Enc(pk,RI[i])". RI[i] represents information before encryption of representative information 141-$i$. In this case, the registration unit 102 is able to calculate "CD[i]" that is a value of a distance between registration-use input information and representative information 141-$i$ being encrypted, by $$CD[i]=Enc(pk,d(RI[i],X)) \quad \text{(Equation 2)}$$

by using homomorphism of somewhat homomorphic encryption. The registration unit 102 calculates "CD[i]", as represented in equation 2, for pieces of representative information 141-1 to 141-L and thereby generates registration-use encrypted distance information "{CD[1], . . . , CD[L]}".

The registration unit 102 decrypts the generated registration-use encrypted distance information "{CD[1], . . . , CD[L]}" by using a secret key sk stored on the secret key storage unit 103. The decrypted "CD[i]" is represented as "Dec(sk, CD[i])". The registration unit 102 identifies i which minimizes "Dec(sk, CD[i])". The registration unit 102 stores the encrypted registration-use input information "Enc(pk,X)" on the storage device 140 as information to be matched 142-$j$ (j is any integer among 1 to N) and registers (adds) a record that associates the information to be matched 142-$j$ and the identified representative information 141-$i$ on the management table 143 stored on the storage device 140.

FIG. 2 is a diagram exemplarily illustrating a configuration of the management table 143 according to the present example embodiment. An "information to be matched identifier" included in the management table 143 represents an identifier which is able to identify pieces of information to be matched 142-1 to 142-N. A "belonging group" included in the management table 143 represents representative information 141-$i$ associated with information to be matched 142-$j$ indicated by the "information to be matched identifier". The management table 143 exemplarily illustrated in FIG. 2 indicates, when, for example, a first row of the table is referred to, that information to be matched 142-1 belongs to a group represented by representative information 141-3. The management table 143 indicates, when a second row of the table is referred to, that information to be matched 142-2 belongs to a group represented by representative information 141-8.

The matching request device 120 illustrated in FIG. 1 includes a distance calculation unit 121 and a matching query generation unit 122. Matching-use input information (first input information) is input to the matching request device 120 from another device that is not illustrated. The matching-use input information is information to be matched, by the encrypted information matching system 10, with pieces of information to be matched 142-1 to 142-N previously stored (registered) on the storage device 140. The matching-use input information is information encrypted by using a public key pk, similarly to registration-use input information. The matching-use input information may be generated, for example, by the matching request device 120, without being input from an outside.

The distance calculation unit 121 calculates a distance between matching-use input information and individual pieces of representative information 141-1 to 141-L stored on the storage device 140 in a state that the matching-use input information and these pieces of representative information 141-1 to 141-L are encrypted. A distance between matching-use input information and representative information is an indicator representing a similarity (first similarity) between the matching-use input information and the representative information.

Encrypted matching-use input information is represented as "Enc(pk,Y)". In this case, the distance calculation unit 121 is able to calculate "AD[i]" that is a value of a distance between matching-use input information and representative information 141-$i$ being encrypted, by $$AD[i]=Enc(pk,d(RI[i],Y)) \quad \text{(Equation 3)}$$

by using homomorphism of somewhat homomorphic encryption. The distance calculation unit 121 calculates "AD[i]", as represented in equation 3, for pieces of representative information 141-1 to 141-L and thereby generates matching-use encrypted distance information "{AD[1], . . . , AD[L]}".

The matching query generation unit 122 generates a matching query "({AD[1], . . . , AD[L]},Enc(pk,Y))" including matching-use input information "Enc(pk,Y)" and the matching-use encrypted distance information "{AD[1], . . . , AD[L]}" calculated by the distance calculation unit 121. The matching query generation unit 122 transmits the generated matching query to the matching execution unit 130.

The matching execution unit 130 includes an identification unit 131, a determination unit 132, and a secret key storage unit 133. The secret key storage unit 133 is a storage device such as an electronic memory or a magnetic disk and stores a secret ley sk delivered from the encryption key generation device 150.

The identification unit 131 decrypts matching-use encrypted distance information "{AD[1], . . . , AD[L]}" included in the matching query received from the matching request device 120 by using a secret key sk stored on the secret key storage unit 133. The decrypted "AD[i]" is represented as "Dec(sk, AD[i])". The identification unit 131 identifies i which minimizes a value of "Dec(sk, AD[i])".

The determination unit 132 acquires, from the storage device 140, information to be matched 142-k (k is at least any integer among 1 to N) belonging to a group i identified by the identification unit 131, by referring to the management table 143. The determination unit 132 determines "mismatch" as a matching result when the information to be matched 142-k belonging to the group i identified by the identification unit 131 does not exist.

The determination unit 132 is able to calculate "DXY[k]" that is a value of a distance between matching-use input information and, for example, K (K is any natural number) pieces of information to be matched 142-k acquired from the storage device 140 being encrypted, by $$DXY[k]=Enc(pk,d(X[k],Y))\qquad\text{(Equation 4)}$$

by using homomorphism of somewhat homomorphic encryption. In equation 4, "X[k]" represents information before the information to be matched 142-k is encrypted.

The determination unit 132 decrypts the calculated K "DXY[k]"s by using a secret key sk stored on the secret key storage unit 133. The decrypted "DXY[k]" is represented as "Dec(sk,DXY[k])". "Dec(sk,DXY[k])" is an indicator representing a similarity (second similarity) between matching-use input information and information to be matched. The identification unit 131 determines whether values of the K "Dec(sk,DXY[k])"s satisfy criteria (e.g. whether to be equal to or less than a threshold). The identification unit 131 determines "match" as a matching result when Dec(sk, DXY[k]" whose value is equal to or less than the threshold exists. The identification unit 131 determines "mismatch" as a matching result when Dec(sk,DXY[k])" whose value is equal to or less than the threshold does not exist.

Figure 3:
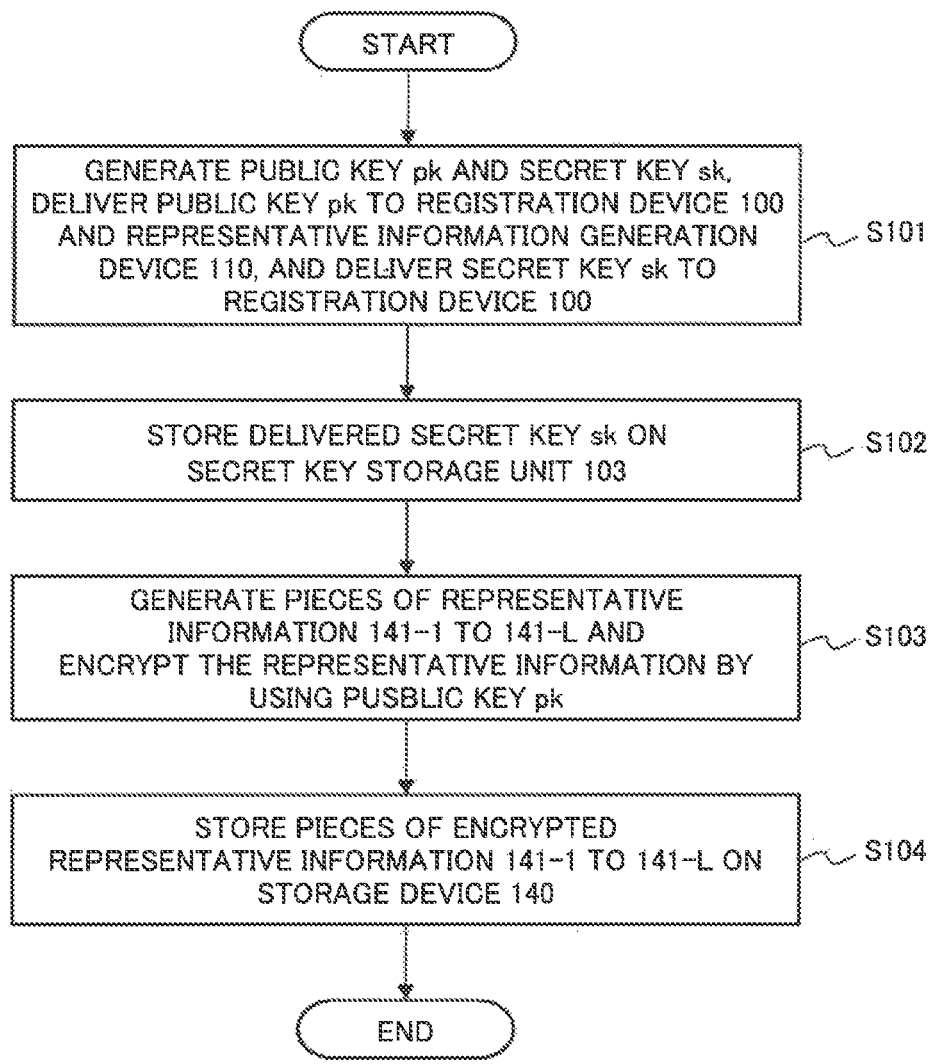
FIG. 3 is a flowchart illustrating an operation (registration preparation operation for information to be matched) in which the encrypted information matching system 10 according to the first example embodiment of the invention of the present application generates representative information and stores the generated representative information on a storage device 140.

Next, with reference to flowcharts of FIGS. 3 to 5, an operation (processing) of the encrypted information matching system 10 according to the present example embodiment is described in detail.

FIG. 3 is a flowchart illustrating an operation (a registration preparation operation for information to be matched) in which the encrypted information matching system 10 according to the present example embodiment generates representative information and stores the generated representative information on the storage device 140.

The encryption key generation device 150 generates a public key pk and a secret key sk, delivers the generated public key pk to the registration device 100 and the representative information generation device 110, and delivers the generated secret key sk to the registration device 100 (step S101). The registration device 100 stores the delivered secret key sk on the secret key storage unit 103 (step S102).

The generation unit 111 in the representative information generation device 110 generates pieces of representative information 141-1 to 141-L on the basis of information representing a generation specification of representative information input from an outside and encrypts the pieces of representative information by using the public key pk (step S103). The generation unit 111 stores the pieces of encrypted representative information 141-1 to 141-L on the storage device 140 (step S104), and the whole processing is terminated.

FIG. 4 is a flowchart illustrating an operation in which the encrypted information matching system 10 according to the present example embodiment registers registration-use input information as information to be matched.

Registration-use input information is input to the registration device 100 (step S201). The distance calculation unit 101 in the registration device 100 calculates distances between individual pieces of representative information 141-1 to 141-L and the registration-use input information as registration-use encrypted distance information (step S202).

The registration unit 102 in the registration device 100 decrypts, by using the secret key sk, the registration-use encrypted distance information calculated by the distance calculation unit 101, compares distances included in the decrypted registration-use encrypted distance information, and thereby identifies representative information which minimizes a distance (step S203). The registration unit 102 stores the registration-use input information as information to be matched and registers a record that associates the registered information to be matched and an identifier of the identified representative information on the management table 143 (step S204), and the whole processing is terminated.

FIGS. 5A and 5B each are a flowchart illustrating an operation in which the encrypted information matching system 10 according to the present example embodiment matches matching-use input information with information to be matched.

Matching-use input information is input to the matching request device 120 (step S301). The distance calculation unit 121 in the matching request device 120 calculates distances between individual pieces of representative information 141-1 to 141-L and the matching-use input information as matching-use encrypted distance information (step S302). The matching query generation unit 122 in the matching request device 120 generates a matching query from the matching-use encrypted distance information and the matching-use input information and inputs the generated matching query to the matching execution device 130 (step S303).

The identification unit 131 in the matching execution device 130 decrypts the matching-use encrypted distance information included in the matching query by using a secret key sk, compares distances included in the decrypted matching-use encrypted distance information, and thereby identifies representative information (group) which minimizes a distance (step S304). When information to be matched belonging to the group identified by the identification unit 131 does not exist in the management table 143 (No in step S305), the determination unit 132 in the matching execution device 130 determines "mismatch" as a matching result (step S311), and the whole processing is terminated.

When information to be matched belonging to the group identified by the identification unit 131 exists in the management table 143 (Yes in step S305), the determination unit 132 acquires, from the storage device 140, the information to be matched belonging to the group identified by the identification unit 131 in the management table 143 (step S306).

The identification unit 131 calculates a distance between the acquired information to be matched and the matching-use input information (step S307). The identification unit 131 decrypts the calculated distance by using a secret key sk and thereby confirms whether or not information to be matched whose distance is equal to or less than a threshold exists (step S308).

When information to be matched whose distance is equal to or less than the threshold does not exist (No in step S309), the processing moves to step S311. When information to be matched whose distance is equal to or less than the threshold exists (Yes in step S309), the identification unit 131 determines "match" as a matching result (step S310), and the whole processing is terminated.

The encrypted information matching system 10 according to the present example embodiment is able to execute matching processing that permits ambiguity in information to be matched safely and at high speed. The reason is that the encrypted information matching system 10 executes processing of managing pieces of information to be matched 142-1 to 142-N grouped according to a characteristic, identifying representative information which makes a distance to matching-use input information be shortest (similarity is highest), and determining whether or not information to be matched which makes a distance to matching-use input information satisfy criteria (is equal to or less than a threshold), belonging to a group represented by the representative information exists in a state that the matching-use input information and the information to be matched are encrypted.

Hereinafter, advantageous effects achieved by the encrypted information matching system 10 according to the present example embodiment are described in detail.

In general, it is conceivable that upon executing one-to-N biometric authentication, after a target to be matched is narrowed down, for example, by grouping based on a feature value acquired from a living body, or by execution of simple authentication using a part of biological information, matching processing that permits ambiguity in information of the target to be matched is executed. Such matching processing is able to be realized, when the biological information is not concealed, by executing calculation using a value indicated by the biological information. However, in biometric authentication in which safety is higher and biological information is concealed, biological information transmitted from a person to be authenticated is concealed by encryption or the like, and therefore it is difficult to execute the above-described matching processing. In other words, a problem is to execute matching processing that permits ambiguity in information of a target to be matched safely and at high speed.

For such a problem, in the encrypted information matching system 10 according to the present example embodiment, when information to be matched are classified into groups on the basis of similarity in characteristics, the storage device 140 stores pieces of encrypted representative information 141-1 to 141-L and pieces of encrypted information to be matched 142-1 to 142-N in association with each other. The encrypted representative information 141-1 to 141-L represent a group, and the pieces of encrypted information to be matched 142-1 to 142-N belong to the group. The distance calculation unit 121 in the matching request device 120 calculates distances between matching-use input information and the pieces of representative information 141-1 to 141-L stored on the storage device 140. The identification unit 131 identifies a group represented by representative information which makes the calculated distance be shortest. The determination unit 132 calculates a distance between the encrypted matching-use input information and the encrypted information to be matched belonging to the group identified by the identification unit 131 in a state that the matching-use input information and the information to be matched are encrypted. The determination unit 132 determines whether or not information to be matched which makes the distance satisfy criteria (is equal to or less than a threshold) exists. In other words, the encrypted information matching system 10 executes the above-described matching processing that permits ambiguity in information to be matched while a state where matching-use input information and information to be matched are encrypted is maintained. Thereby, the encrypted information matching system 10 according to the present example embodiment is able to execute matching processing that permits ambiguity in information to be matched safely and at high speed.

Further, the distance calculation unit 101 in the registration device 100 according to the present example embodiment calculates distances between registration-use input information and pieces of representative information 141-1 to 141-L. The registration unit 102 in the registration device 100 stores the registration-use input information on the storage device 140 in association with representative information which makes the calculated distance be shortest. In other words, the encrypted information matching system according to the present example embodiment automatically stores information on the storage device 140 and therefore can reduce a load on a user.

Further, the generation unit 111 in the representative information generation device 110 according to the present example embodiment generates representative information on the basis of information representing a generation specification of the representative information, encrypts the generated representative information, and stores the encrypted representative information on the storage device 140. The distance calculation unit 101 calculates a distance between registration-use input information and the representative information in a state that the registration-use input information and the representative information are encrypted. Thereby, the encrypted information matching system 10 according to the present example embodiment maintains a state where registration-use input information is encrypted also in processing of identifying a group to be matched and therefore can more safely execute matching processing that permits ambiguity in information to be matched.

Note that, pieces of representative information 141-1 to 141-L are not information representing specific individual biological information, and therefore confidentiality is not required so much as registration-use input information, matching-use input information, and pieces of information to be matched 142-1 to 142-N. Therefore, the encrypted information matching system 10 according to the present example embodiment may manage pieces of representative information 141-1 to 141-L without encryption and may use the pieces of representative information 141-1 to 141-L that are not encrypted as components included in the encrypted information matching system 10. In this case, the registration device 100 calculates a distance between registration-use input information of a plain text (i.e., before being encrypted or after being decrypted) and representative information, encrypts the registration-use input information, and stores the encrypted registration-use input information on the storage device 140. The matching request device 120 and the matching execution device 130 acquire pieces of encrypted information to be matched 142-1 to 142-L from the storage device 140 and transmit/receive generated matching-use encrypted distance information. Therefore, the encrypted information matching system 10 according to the present example embodiment is able to execute, also in this case, matching processing while confidentiality is maintained for information for which confidentiality is required.

Further, the encrypted information matching system 10 according to the present example embodiment may use, as a similarity, a hamming distance or a Mahalanobis distance in addition to a Euclidean distance. The encrypted information matching system 10 may use a method for executing matching processing while a distance between matching-use input information and information to be matched is concealed, as described in NPL 1 or NPL 2. Alternatively, the encrypted information matching system 10 according to the present example embodiment may use, as a similarity, information indicating a similarity other than these distances.

Note that, when, in a group which makes a distance between matching-use input information and representative information be shortest, information to be matched which makes a distance to the matching-use input information satisfy criteria does not exist, the encrypted information matching system 10 according to the present example embodiment may change a group to be matched, sequentially in order of a shorter distance, from a group which makes a distance be second shortest. Thereby, the encrypted information matching system 10 according to the present example embodiment is able to avoid, at high speed, a case of determining mismatch (false negative) as a matching result even when there exists, in any group except a group which makes a distance between matching-use input information and representative information be shortest, information to be matched which makes a distance to the matching-use input information satisfy criteria.

Second Example Embodiment

FIG. 6 is a block diagram conceptually illustrating a configuration of an encrypted information matching device 20 according to a second example embodiment of the invention of the present application. The encrypted information matching device 20 includes an identification unit 231, a determination unit 232, and a storage unit 240.

The storage unit 240 stores, when one or more pieces of information to be matched are classified into groups on the basis of similarity in a characteristic, one or more pieces of representative information 241-1 to 241-L (L is any natural number) and pieces of encrypted information to be matched 242-1 to 242-N (N is any natural number) in association with each other. The representative information 241-1 to 241-L represent the group, and pieces of encrypted information to be matched 242-1 to 242-N belong to the group.

The identification unit 231 calculates a first similarity between encrypted input information and pieces of representative information 241-1 to 241-L stored on the storage unit 240. The identification unit 231 identifies, on the basis of the calculated first similarity, a group to be matched with the encrypted input information.

The determination unit 232 calculates a second similarity between the encrypted input information and the encrypted information to be matched in a state that the input information and the information to be matched are encrypted. The information to be matched belongs to the group identified by the identification unit 231. The determination unit 232 determines whether or not the information to be matched which makes the calculated second similarity satisfy criteria exists.

The encrypted information matching device 20 according to the present example embodiment is able to execute matching processing that permits ambiguity in information to be matched safely and at high speed. The reason is that the encrypted information matching device 20 is able to execute processing of managing pieces of information to be matched 242-1 to 242-N grouped according to a characteristic, identifying, on the basis of a similarity between input information and representative information, a group to be matched with the input information, and determining whether or not information to be matched belonging to the identified group which makes a distance to the input information be shorter than a threshold exists in a state that the input information and the information to be matched are encrypted.

<Hardware Configuration Example>

Each unit in the encrypted information matching device (system) illustrated in FIGS. 1 and 6 in the above-described example embodiments is able to be achieved by using dedicated hardware (HW) (electronic circuit). Further, in FIGS. 1 and 6, it is conceivable that at least the following components are function (processing) units (software modules) of a software program.

The distance calculation unit 121
The matching query generation unit 122
The identification units 131 and 231
The determination units 132 and 232

However, division of the units illustrated in these drawings is a configuration for convenience of description, and upon implementation, various configurations are assumable. One example of a hardware environment in this case is described with reference to FIG. 7.

FIG. 7 is a diagram exemplarily illustrating a configuration of an information processing device 900 (computer) capable of running the encrypted information matching device (system) according to the example embodiments of the invention of the present application. In other words, FIG. 7 is a configuration of a computer (information processing device) capable of realizing the encrypted information matching device (system) illustrated in FIGS. 1 and 6 and illustrates a hardware environment capable of realizing functions in the above-described example embodiments.

The information processing device 900 illustrated in FIG. 7 includes the following as components.

A central processing unit (CPU) 901
A read only memory (ROM) 902
A random access memory (RAM) 903
A hard disk (storage device) 904
A communication interface 905 for external device
A bus 906 (communication line)
A reader/writer 908 capable of reading/writing data stored on a recording medium 907 such as a compact disc read only memory (CD-ROM) and the like
An input/output interface 909

In other words, the information processing device 900 including the components is a general computer in which these components are connected via the bus 906. The information processing device 900 may include a plurality of CPUs 901 or may include a CPU 901 including a multicore.

The invention of the present application described by using the above-described example embodiments as examples supply, to the information processing device 900 illustrated in FIG. 7, a computer program capable of realizing the following function. The function is the above-described configuration in the block configuration diagram (FIGS. 1 and 6) or the above-described function of the flowchart (FIGS. 3 and 5) referred to in the description of the example embodiments. The invention of the present application is achieved by reading the computer program on the CPU 901 of the hardware, and interpreting and executing the read computer program. Further, a computer program supplied into the device may be stored on a readable/writable transitory memory (RAM 903) or a readable/writable non-transitory storage device such as the ROM 902 and the hard disk 904.

Further, in the above case, as a method for supplying a computer program into the hardware, a general procedure is currently employable. As the procedure, there are, for example, a method for installation into the device via various types of storage media 907 such as a CD-ROM, and a method for download from an outside via a communication line such as the Internet, and the like. In such a case, it is conceivable that the invention of the present application includes a code configuring the computer program or includes the recording medium 907 storing the code.

The invention of the present application has been described so far with the above example embodiments by way of model example. However, the invention of the present application is not limited to the example embodiments described above. In other words, various aspects that can be understood by a person skilled in the art are applicable to the invention of the present application within the scope of the invention of the present application.

This application is based upon and claims the benefit of priority from Japanese patent application No. 2016-110642, filed on Jun. 2, 2016, the disclosure of which is incorporated herein in its entirety by reference.

REFERENCE SIGNS LIST

10 Encrypted information matching system
100 Registration device
101 Distance calculation unit
102 Registration unit
103 Secret key storage unit
110 Representative information generation device
111 Generation unit
120 Matching request device
121 Distance calculation unit
122 Matching query generation unit
130 Matching execution unit
131 Identification unit
132 Determination unit
133 Secret key storage unit
140 Storage device
141-1 to 141-L Representative information
142-1 to 142-N Information to be matched
143 Management table
150 Encryption key generation device
20 Encrypted information matching device
231 Identification unit
232 Determination unit
240 Storage unit
241-1 to 241-L Representative information
242-1 to 242-N Information to be matched
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. An encrypted information matching device comprising:
a storage configured to store, when one or more pieces of information to be matched are classified into classified groups, based on similarity in a characteristic, one or more pieces of representative information and the information to be matched in association with each other, the representative information representing each of the classified groups, and the information to be matched being encrypted and belonging to the classified group;
at least one memory storing a computer program; and
at least one processor configured to execute the computer program to, in matching first input information in the information to be matched,
encrypt the information to be matched and the first input information;
calculate a first similarity between the first input information being encrypted and the one or more pieces of representative information stored on the storage;
match the first input information in the representative information of the classified groups to be matched;
identify, based on the first similarity being calculated, an identified group of the classified groups to be matched with the first input information;
calculate a second similarity between the first input information being encrypted and the one or more pieces of information to be matched being encrypted in a state that the first input information and the information to be matched are encrypted, the information to be matched belonging to the identified group;
determine whether or not the information to be matched exists, and the information to be matched has a calculated second similarity that satisfies a criteria exists if the information to be matched exists; and
when the information to be matched, whose calculated second similarity satisfies the criteria, does not exist in the identified group in which the first similarity between the first input information and the representative information is the largest of the classified groups, change the identified group to be matched, sequentially in order of a larger similarity of the classified groups, from the classified group in which the first similarity is the second largest of the classified groups.

2. The encrypted information matching device according to claim 1, wherein
the storage stores the representative information which is encrypted, and
the processor is configured to execute the computer program to
calculate the first similarity in a state that the first input information and the representative information are encrypted.

3. The encrypted information matching device according to claim 1, wherein the processor is configured to execute the computer program to
calculate the second similarity between the first input information encrypted by homomorphic encryption and the information to be matched encrypted by homomorphic encryption.

4. The encrypted information matching device according to claim 2, wherein
the processor is configured to execute the computer program to
calculate the first similarity between the first input information encrypted by homomorphic encryption and the representative information encrypted by homomorphic encryption.

5. The encrypted information matching device according to claim 1, wherein the processor is configured to execute the computer program to
calculate third similarities between encrypted second input information and each of the one or more pieces of representative information stored on the storage, identify the identified group represented by the representative information whose third similarity is highest of all the third similarities being calculated, and store the encrypted second input information on the storage as the information to be matched in association with the identified group.

6. The encrypted information matching device according to claim 5, wherein the processor is configured to execute the computer program to calculate the third similarities between the encrypted second input information and the representative information, both being encrypted by homomorphic encryption.

7. The encrypted information matching device according to claim 1, wherein the processor is configured to execute the computer program to generate the representative information, based on information, being input from an outside, representing a generation specification of the representative information, and store the representative information being generated on the storage.

8. The encrypted information matching device according to claim 1, wherein the processor is configured to execute the computer program to calculate, as the first similarity, a square Euclidean distance, a Hamming distance, or a square Mahalanobis distance between the first input information and the representative information, identify the group represented by the representative information whose distance indicating the first similarity being calculated is shortest, calculate, as the second similarity, a square Euclidean distance, a Hamming distance, or a square Mahalanobis distance between the first input information and the information to be matched, and determine whether or not the information to be matched whose distance indicating the second similarity being calculated is equal to or less than a threshold exists.

9. An encrypted information matching method comprising:

when one or more pieces of information to be matched are classified into classified groups, based on similarity in a characteristic, and one or more pieces of representative information and the information to be matched are stored on a storage in association with each other, the representative information representing each of the classified groups, and the information to be matched being encrypted and belonging to the classified group, by using an information processing device, in matching first input information in the information to be matched, encrypting the information to be matched and the first input information;

calculating a first similarity between the first input information being encrypted and the one or more pieces of representative information stored on the storage;

matching the first input information in the representative information of the classified groups to be matched;

identifying, based on the first similarity being calculated, an identified group of the classified groups to be matched with the first input information;

calculating a second similarity between the first input being encrypted information and the one or more pieces of information to be matched being encrypted in a state that the first input information and the information to be matched are encrypted, the information to be matched belonging to the identified group;

determining whether or not the information to be matched exists, and the information to be matched has a calculated second similarity that satisfies a criteria exists if the information to be matched exists; and when the information to be matched whose calculated second similarity satisfies the criteria does not exist in the identified group in which the first similarity between the first input information and the representative information is the largest of the classified groups, changing the identified group to be matched, sequentially in order of a larger similarity of the classified groups, from the classified group in which the first similarity is the second largest of the classified groups.

10. A non-transitory computer readable recording medium storing an encrypted information matching program that causes a computer accessible to a storage that stores, when one or more pieces of information to be matched are classified into classified groups, based on similarity in a characteristic, one or more pieces of representative information and the information to be matched in association with each other, the representative information representing each of the classified groups, and the information to be matched being encrypted and belonging to the classified group, to execute, in matching first input information in the information to be matched:

processing of encrypting the information to be matched and the first input information;

processing of calculating a first similarity between the first input information being encrypted and the one or more pieces of representative information stored on the storage;

processing of matching the first input information in the representative information of the classified groups to be matched;

processing of identifying, based on the first similarity being calculated, an identified group of the classified groups to be matched with the first input information;

processing of calculating a second similarity between the first input information being encrypted and the one or more pieces of information to be matched being encrypted in a state that the first input information and the information to be matched are encrypted, the information to be matched belonging to the identified group;

processing of determining whether or not the information to be matched exists, and the information to be matched has a calculated second similarity that satisfies a criteria exists if the information to be matched exists; and when the information to be matched whose calculated second similarity satisfies the criteria does not exist in the identified group in which the first similarity between the first input information and the representative information is the largest of the classified groups, processing of changing the identified group to be matched, sequentially in order of a larger similarity of the classified groups, from the classified group in which the first similarity is the second largest of the classified groups.

* * * * *